US011756402B2

(12) United States Patent
Hansen et al.

(10) Patent No.: US 11,756,402 B2
(45) Date of Patent: Sep. 12, 2023

(54) OPERATOR PROFICIENCY-BASED INFRASTRUCTURE ARTICLES

(71) Applicant: 3M INNOVATIVE PROPERTIES COMPANY, St. Paul, MN (US)

(72) Inventors: Kristen J. Hansen, Afton, MN (US); Douglas S. Dunn, Woodbury, MN (US); Jonathan D. Gandrud, Woodbury, MN (US)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 101 days.

(21) Appl. No.: 17/609,848

(22) PCT Filed: May 20, 2020

(86) PCT No.: PCT/IB2020/054795
§ 371 (c)(1),
(2) Date: Nov. 9, 2021

(87) PCT Pub. No.: WO2020/240353
PCT Pub. Date: Dec. 3, 2020

(65) Prior Publication Data
US 2022/0223024 A1 Jul. 14, 2022

Related U.S. Application Data

(60) Provisional application No. 62/852,500, filed on May 24, 2019.

(51) Int. Cl.
*G08B 21/18* (2006.01)
*B62K 11/00* (2006.01)
*G07C 5/00* (2006.01)

(52) U.S. Cl.
CPC ............ *G08B 21/18* (2013.01); *B62K 11/00* (2013.01); *B62K 2202/00* (2013.01); *G07C 5/008* (2013.01)

(58) Field of Classification Search
CPC .... G08B 21/18; B62K 11/00; B62K 2202/00; G07C 5/008
See application file for complete search history.

(56) References Cited

U.S. PATENT DOCUMENTS 5,775,452 A 7/1998 Patmont
6,226,389 B1 * 5/2001 Lemelson ............. G01S 13/867
382/104

(Continued)

FOREIGN PATENT DOCUMENTS

WO WO 2017-114947 7/2017
WO WO 2018-049085 3/2018

OTHER PUBLICATIONS

Bliss, "Behind the Big Promises of the Micromobility Industry", CITYLAB [on line], Feb. 2019, (Retrieved from Internet Mar. 25, 2019), URL <https://www.citylab.com/transportation/2019/02/micromobility-conference-electric-scooters-bike-share/581791/>, 7 pages.

(Continued)

*Primary Examiner* — Hai Phan
*Assistant Examiner* — Son M Tang
(74) *Attorney, Agent, or Firm* — Jonathan L. Tolstedt (57) ABSTRACT

An infrastructure article includes a signal receiver device configured to receive a wireless signal from a signal emitter device configured at an electrically powered scooter; and a controller configured to determine information, coded in the wireless signal, that is based on an operator proficiency of an operator of the electrically powered scooter; and to perform, based at least in part on the information that indicates the operator proficiency of the operator of the electrically powered scooter, at least one operation.

20 Claims, 5 Drawing Sheets

(56) References Cited

U.S. PATENT DOCUMENTS

| | | | |
|---|---|---|---|
| 6,551,014 B2 | 4/2003 | Khieu | |
| 7,040,443 B1* | 5/2006 | Roth | B62K 3/002 |
| | | | 180/68.5 |
| 7,234,892 B2* | 6/2007 | Raaijmakers | E01F 9/582 |
| | | | 404/9 |
| 9,399,406 B2 | 7/2016 | Dastoor | |
| 9,460,618 B1* | 10/2016 | Soltesz | G08G 1/0145 |
| 9,536,425 B1* | 1/2017 | Soltesz | G08G 1/096716 |
| 9,911,334 B2* | 3/2018 | Townsend | G08G 1/096741 |
| 9,914,500 B2* | 3/2018 | Gerencsér | B62K 15/006 |
| 9,972,054 B1* | 5/2018 | Konrardy | G06Q 40/00 |
| 10,185,999 B1* | 1/2019 | Konrardy | G06Q 40/08 |
| 10,424,199 B2* | 9/2019 | Hamada | H04W 4/027 |
| 10,426,675 B1* | 10/2019 | Erickson | A61G 5/04 |
| 11,136,730 B2* | 10/2021 | Shah | E01C 17/00 |
| 11,170,641 B2* | 11/2021 | Soltesz | G08G 1/096716 |
| 11,288,959 B2* | 3/2022 | Zack | E01F 9/30 |
| 2003/0125853 A1* | 7/2003 | Takagi | G08G 1/205 |
| | | | 340/436 |
| 2007/0048084 A1* | 3/2007 | Jung | H04L 67/52 |
| | | | 404/9 |
| 2008/0296329 A1* | 12/2008 | Guckes | B62J 7/04 |
| | | | 224/412 |
| 2009/0125160 A1* | 5/2009 | Desai | B62D 61/08 |
| | | | 701/1 |
| 2009/0256723 A1* | 10/2009 | Peddie | E01F 9/559 |
| | | | 340/907 |
| 2013/0113618 A1 | 5/2013 | Flanagan | |
| 2014/0196968 A1* | 7/2014 | Bieler | B62H 5/08 |
| | | | 180/181 |
| 2014/0277844 A1* | 9/2014 | Luke | B60L 53/305 |
| | | | 701/123 |
| 2014/0312644 A1* | 10/2014 | Srabstein | B62J 17/08 |
| | | | 296/89 |
| 2015/0032317 A1* | 1/2015 | Kato | B60W 50/0097 |
| | | | 180/65.265 |
| 2015/0109148 A1* | 4/2015 | Cheatham, III | G01S 11/12 |
| | | | 340/944 |
| 2017/0249810 A1 | 8/2017 | Zerick | |
| 2018/0154971 A1* | 6/2018 | Zuo | B62K 11/02 |
| 2018/0222473 A1 | 8/2018 | Shami | |
| 2023/0115660 A1* | 4/2023 | Sivakumar | G06T 7/80 |
| | | | 348/187 |

OTHER PUBLICATIONS

Doctorow, "A Guide to The Valuable Electronics Inside Bird's Illegal-In-San Francisco Scooters", Boing Boing [on line], May 2018, (Retrieved from Internet Mar. 25, 2019), URL <https://boingboing.net/2018/05/25/drinkbot-anyone.html>, 6 pages.

"E Series Module Datasheet (V001)", Particle Datasheets [on line], Nov. 2017, (Retrieved from Internet Mar. 25, 2019), URL <https://docs.particle.io/datasheets/cellular/e-series-datasheet/>, 28pages.

Hawkins, "The electric scooter craze is officially one year old—what's next?", The Verge [on line], Sep. 20, 2018 (Retrieved from Internet Mar. 25, 2019), URL <https://www.theverge.com/2018/9/20/17878676/electric-scooter-bird-lime-uber-lyft>, 8 pages.

Holley, "Scooter use is rising in major cities. So are trips to the emergency room", The Washington Post [on line], Sep. 2018, (Retrieved from Internet Mar. 25, 2019), URL <https://www.washingtonpost.com/business/economy/scooter-use-is-rising-in-major-cities-so-are-trips-to-the-emergency-room/2018/09/06/53d6a8d4-abd6-11e8-a8d7-0f63ab8b1370_story.html>, 6 pages.

Hyatt, "Fantasmo will use AR to track dockless scooters", Road Show [on line], Nov. 2018, (Retrieved from Internet Jan. 7, 2022), URL <https://www.cnet.com/roadshow/news/fantasmo-dockless-scooter-ar-lime/>, 2 pages.

"M365 Model Repair Guide", Bird [on line], (date unknown but believed to be prior to the date of the filing of the present application), (Retrieved from Internet Mar. 25, 2019), URL <https://bird.zendesk.com/hc/en-us/articles/360015313392-M365-Model-Repair-Guide>, 34 pages.

Marshall, "Micromobility: The Prose and Poetry of the Scooter-Faithful", Wired [on line], Apr. 2, 2019 (Retrieved from Internet Mar. 25, 2019), URL <https://www.wired.com/story/micromobility-conference-scooters-bikes/>, 8 pages.

Robinson, "A Startup in the West Coast Scooter Sharing Craze is Already Worth $1 Billion—Here's What it's Like to Ride a Bird Scooter", Business Insider [on line], May 2018, (Retrieved from Internet Mar. 25, 2019), URL <https://www.businessinsider.com/bird-electric-scooter-review-2018-4>, 28 pages.

Senese, "Vandals Crack Open Dockless Scooter, Discover Particle Electron Board Inside" Make on line], Apr. 25, 2018 (Retrieved from Internet Mar. 25, 2019), URL <https://makezine.com/2018/04/25/vandals-crack-open-dockless-scooter-discover-particle-electron-board-inside/>, 6 pages.

The Micro-Mobility Revolution: The Introduction and Adoption of Electric Scooters in the United States, A Populus Research Report, Jul. 2018, 18 pages.

Vock, "Scooters Are Suddenly Everywhere. What Should Cities Be Doing About It?", Governing, Nov. 27, 2018 (Retrieved from Internet Mar. 25, 2019), URL <https://www.governing.com/topics/transportation-infrastructure/gov-electric-scooters-bird.html>, 5 pages.

International Search Report for PCT International Application No. PCT/IB2020/054795, dated Jul. 27, 2020, 4 pages.

* cited by examiner

OPERATOR PROFICIENCY-BASED INFRASTRUCTURE ARTICLES

CROSS REFERENCE TO RELATED APPLICATIONS

This application is a national stage filing under 35 U.S.C. 371 of PCT/IB2020/054795, filed May 20, 2020, which claims the benefit of Provisional Application No. 62/852,500, filed May 24, 2021, the disclosure of which is incorporated by reference in its/their entirety herein.

TECHNICAL FIELD

The present application relates generally to electrically powered scooters and roadway infrastructure.

BACKGROUND

Electric scooters are often used to transport people over relatively short distances. A user of an electric scooter typically rides the scooter on a roadway, street, pathway or a sidewalk, and frequently may use the scooter in urban or campus settings as a convenient mode of transportation. In many situations, the roadway/street used by the scooter (or adjacent to the path or lane used by the scooter) may by occupied by vehicles travelling at relatively high speeds compared to the scooter. Moreover, sidewalks are often occupied by pedestrians travelling at relatively low speeds compared to the scooter. Navigating roadways, streets, paths and/or sidewalks may pose a risk to the safety of the user of the electric scooter, occupants of a vehicle, pedestrians, or any other person, pet, or property in proximity to the scooter.

DETAILED DESCRIPTION

Figure 1:
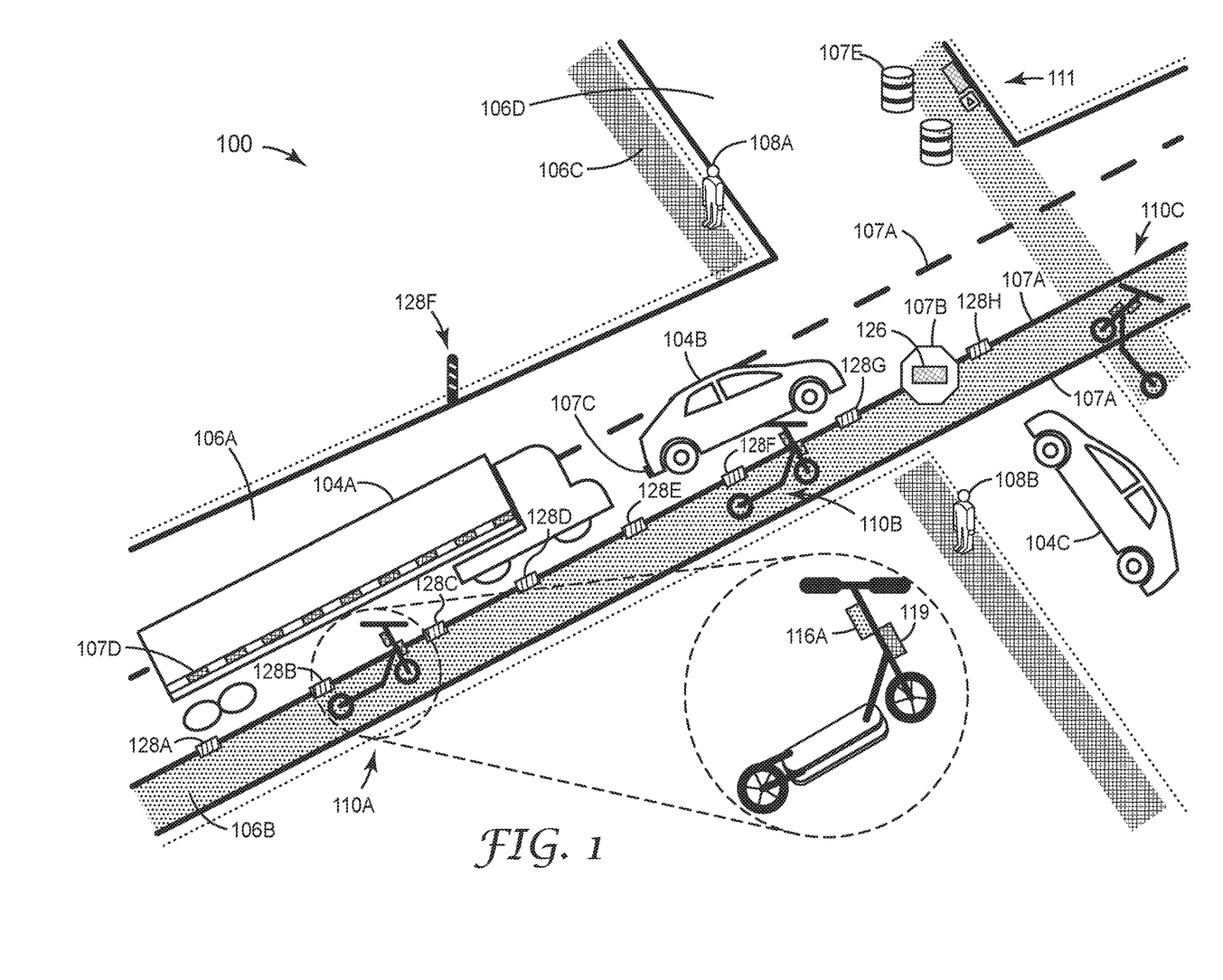
FIG. 1 is a conceptual diagram illustrating an example physical environment having transportation system that includes one or more electrically powered scooters, in accordance with techniques of this disclosure.

FIG. 1 is a conceptual diagram illustrating an example physical environment having a transportation system that includes one or more electrically powered scooters, in accordance with techniques of this disclosure. In the example of FIG. 1, the transportation system 100 includes a variety of different infrastructure elements (generally referred to as "infrastructure"). As shown in the example of FIG. 1, the infrastructure may include dedicated transportation pathways 106A-106D (collectively, transportation pathways 106) as well as infrastructure articles 107A-107E (collectively, infrastructure articles 107) positioned and oriented within the environment.

As shown in FIG. 1, system 100 includes one or more micro-mobility devices. Examples of micro-mobility devices include electrically-powered food delivery devices, electrically powered hoverboards or skateboards, electrically powered scooters 110A-110C (collectively, electrically powered scooters 110), or other small-profile devices that may use or travel upon a roadway or sidewalk. Electrically powered scooters 110 (also referred to herein simply as scooters 110) may operate on transportation pathways 106. As described in more detail with reference to FIG. 3, in this example, electrically powered scooters 110 includes a chassis, a front wheel, a back wheel, an electric motor, a steering assembly, and a battery 119. In this example, the chassis includes a rear-wheel mount at one end of the chassis, a front-wheel mount at another end of the chassis that is opposite the rear-wheel mount, and a chassis support extending horizontally between the rear-wheel mount and the front-wheel mount. The front and rear wheels are mounted to the front and rear wheel mounts of the chassis, respectively. The front wheel mount is coupled to a steering assembly. In some examples, the steering assembly includes handlebars such that turning the handle bars causes the front wheel to turn. In some examples, the electric motor is physically coupled to the scooter chassis and is configured by a motor controller to drive at least one of the chassis-supported front wheel or chassis-supported rear-wheel for powered movement over a ground surface.

Examples of transportation pathways 106 include a vehicle pathway (e.g., pathway 106A, 106D), a bicycle pathway (e.g., pathway 106B), or a pedestrian pathway (e.g., pathway 106C), among others. In other examples, transportation pathways 106 may be sidewalks, public spaces, or other surfaces not specifically dedicated to certain types of vehicles or traffic. Vehicle pathways (e.g., 106A) may be used by vehicles 104A-104C (collectively, vehicles 104) to transport people or goods. Examples of vehicles 104 include automobiles (e.g., 104B, 104C) such as cars, trucks, passenger vans; buses; motorcycles; recreational vehicles (RVs); or lorries (e.g., 104A), etc. Examples of vehicle pathways can also include alleys, streets, and highways (or a vehicle specific portion thereof, such as a vehicle driving lane), among others. Bicycle pathways (e.g., 106B) may be used by bicycles or vehicles and bicycles. Examples of bicycle pathways include a street or a portion of a street designated for bicycles, a bicycle trail, among others. In some instances, a pedestrian pathway (e.g., 106C) is primarily used by pedestrians 108. Examples of pedestrian pathways include a pedestrian sidewalk or a jogging path. In some examples, one of transportation pathways 106 may include two or more different types of pathways. For instance, transportation pathway 106A may include a vehicle driving lane of a vehicle pathway and a bicycle pathway adjacent to the driving lane. Transportation pathways 106 may include portions not limited to the respective pathways themselves. In the example of transportation pathway 106A (e.g., a vehicle pathway), transportation pathway 106 may include the road shoulder, physical structures near the pathway such as toll booths, railroad crossing equipment, traffic lights, guardrails, and generally encompassing any other properties or characteristics of the pathway or objects/structures in proximity to the pathway.

Examples of infrastructure articles include a pavement marking (e.g., infrastructure article 107A), a roadway sign (e.g., infrastructure article 107B), a license plate (e.g., infrastructure article 107C), a conspicuity tape (e.g., infrastructure article 107D), and a hazard marker (e.g., infrastructure article 107E, such as a construction barrel, a traffic cone, a traffic barricade, a safety barrier, among others). Pavement markings may include liquid markings, tape, or raised pavement markings to name only a few examples. In some examples, pavement markings may include sensors, materials, or structures that permit the detection of the marking and/or communication of information between the pavement marking and a receiving device. Additional examples of infrastructure articles 107 include traffic lights, guardrails, billboards, electronic traffic sign (also referred to as a variable-message sign), among others. Infrastructure articles 107 may include information that may be detected by one or more sensors of computing device 116.

In some examples, an infrastructure article, such as infrastructure article 107B, may include an article message 126 on the physical surface of the infrastructure article. Article message 126 may include characters, images, and/or any other information that may be printed, formed, or otherwise embodied on infrastructure article 107B. For example, each infrastructure article 107 may have a physical surface having an article message 126 embodied thereon. Article message 126 may include human-perceptible information and machine-perceptible information.

Human-perceptible information may include information that indicates one or more first characteristics of a pathway, such as information typically intended to be interpreted by human drivers. In other words, the human-perceptible information may provide a human-perceptible representation that is descriptive of at least a portion of the transportation pathway. As described herein, human-perceptible information may generally refer to information that indicates a general characteristic of a transportation pathway and that is intended to be interpreted by a human driver. For example, the human-perceptible information may include words (e.g., "STOP" or the like), symbols, graphics (e.g., an arrow indicating the road ahead includes a sharp turn) or shapes (e.g., signs or lane markings). Human-perceptible information may include the color of the article, the article message or other features of the infrastructure article, such as the border or background color. For example, some background colors may indicate information only, such as "scenic overlook" while other colors may indicate a potential hazard (e.g., the red octagon of a stop sign, or the double yellow line of a no passing zone).

In some instances, the human-perceptible information may correspond to words or graphics included in a specification. For example, in the United States (U.S.), the human-perceptible information may correspond to words or symbols included in the Manual on Uniform Traffic Control Devices (MUTCD), which is published by the U.S. Department of Transportation (DOT) and includes specifications for many conventional signs for roadways. Other countries have similar specifications for traffic control symbols and devices.

Machine-perceptible information may generally refer to information configured to be interpreted by an electrically powered scooter. For example, article message 126 may be encoded via a 2-dimensional bar code, such as a QR code. In some examples, machine-perceptible information may be interpreted by a human driver. In other words, machine-perceptible information may include a feature of the graphical symbol that is a computer-interpretable visual property of the graphical symbol. In some examples, the machine-perceptible information may relate to the human-perceptible information, e.g., provide additional context for the human-perceptible information. In an example of an arrow indicating a sharp turn, the human-perceptible information may be a general representation of an arrow, while the machine-perceptible information may provide an indication of the shape of the turn including the turn radius, any incline of the roadway, a distance from the sign to the turn, or the like. The additional information may be visible to a human operator; however, the additional information may not be readily interpretable by the human operator, particularly at speed. In other examples, the additional information may not be visible to a human operator but may still be machine readable and visible to a vision system of an electrically powered scooter. In some examples, an enhanced infrastructure article may be an optically active article in that the infrastructure article is readily detectable by vision systems, which may include an infrared camera or other camera configured for detecting electromagnetic radiation in one or more bands of the electromagnetic spectrum, which may include the visible band, the infrared band, the ultraviolet band, and so forth. For example, the infrastructure articles may be reflective, such as retroreflective, within one or more bands of the electromagnetic spectrum that are readily detectable by visions systems of the computing device 116.

Article message 126 may indicate a variety of types of information. In some examples, article message 126 may, for instance, provide computing device 116 with static information related to a region of a pathway 106. Static information may include any information that is related to navigation of the pathway associated with article message 126, and not subject to change. For example, certain features of pathways 106 may be standardized and/or commonly used, such that article message 126 may correspond to a pre-defined classification or operating characteristic of the respective pathway. As some examples, article message 126 may indicate a navigational characteristic or feature of the pathway, an operating rule or set of operating rules of the pathway, or the like.

Infrastructure articles 107 may include a variety of indicators and/or markers. For example, infrastructure article 107 may include one or more of an optical tag, a radio-frequency identification tag, a radio-frequency tag, an acoustic surface pattern, or a material configured to provide a signature to a signature-sending system. In some examples, electrically powered scooters 110 may receive data from infrastructure articles 107 via near-field communication (NFC) protocols and signals, laser, or infrared-based readers, or other communication type.

Electrically powered scooters 110 may each include one or more sensors that perceive characteristics of the environment, infrastructure, and other objects around electrically powered scooter 110A. Examples of sensors include an image sensor, sonar, LiDAR, among others. The sensors may generate sensor data indicative of sensed characteristics. For example, the sensor data may include infrastructure data indicative of the infrastructure proximate to a respective scooter of electrically powered scooters 110. An object may be proximate to a particular electrically powered scooter 110 when the object is detectable by one or more sensors of particular electrically powered scooter 110. As one example, the infrastructure data may be indicative of one or more infrastructure articles 107 proximate to a respective scooter of electrically powered scooters 110.

In accordance with techniques of this disclosure, infrastructure articles, such as pavement marking 128A-128H may be configured to perform operations based at least in part on an operator proficiency of an operator of an electrically powered scooter. In environments that include micro-mobility devices, such as electrically powered scooters, operators of such devices may have different degrees or levels of operator proficiency. For example, an operator of an electrically powered scooter with a high degree of operator proficiency may have engaged in more rides, longer distances driven, or have greater familiarity with certain portions of a pathway, to name only a few examples. Conversely, an operator of an electrically powered scooter with a lower degree of operator proficiency may have engaged in fewer rides, fewer distances driven, or have less familiarity with certain portions of a pathway, to name only a few examples. In some instances, the probability of a safety risk may be higher to an operator with a lower operator proficiency. Accordingly, techniques and systems that can operate based on operator proficiency may reduce risks. While conventional infrastructure articles on a pathway may be agnostic to operatory proficiency, techniques and systems of this disclosure may operate based at least in part on operatory proficiency. As such, infrastructure articles and associated techniques and systems of this disclosure may improve safety by changing operation based on operatory proficiency.

In the example of FIG. 1, pavement marking 128E may be an infrastructure article configured in accordance with techniques and systems of this disclosure. Example details of one or more constructions of a pavement marker, such as pavement marking 128E, are described in U.S. Pat. No. 6,551,014, the entire contents of which are hereby incorporated by reference herein in its entirety. Although described with respect to pavement marking 128E, any infrastructure article may be configured in accordance with techniques and systems of this disclosure. For instance, stationary hazard maker 130 or any other infrastructure article may implement techniques of this disclosure. In the example of FIG. 1, pavement marking 128E may include a signal receiver device configured to receive a wireless signal from a signal emitter device configured at an electrically powered scooter. For instance, the signal receiver device may be a light capture device, image capture device, DSRC sensor, WiFi sensor, Bluetooth sensor, LIDAR sensor, or any other receiver device that is capable of receiving a signal. In some examples, the signal receiver device may also be configured to send one or more wireless signals, which may be of any of the types describe with respect to the signal receiver device. In such examples, the combination of receiving and sending functionality in a device may refer to a transceiver.

Pavement marking 128E may include a controller configured to determine information, coded in the wireless signal, that is based on an operator proficiency of an operator of the electrically powered scooter. As further described in this disclosure, the controller may be a general-purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, microcontroller, or state machine. A controller can also be implemented as a combination of computing devices, for example, a combination of a DSP and a microprocessor, multiple microprocessors, one or more microprocessors in conjunction with a DSP core, or any other such configuration.

In accordance with techniques of this disclosure, a computing device associated with electrically powered scooter 110A (e.g., computing device 116A or a computing device associated with an operator of electrically powered scooter 110A) may code information into a wireless signal that is based on an operator proficiency of an operator of the electrically powered scooter. As described above the wireless signal may be light, audible, DSRC, WiFi, Bluetooth, LIDAR, or any other suitable signal. The information encoded into the wireless signal may include information that indicates or is based at least in part on operator proficiency. In some examples, the information encoded in the wireless signal may be information that is different from or not based at least in part on operator proficiency. In some examples, the signal receiver device may be a light signal receiver device configured to receive a set of light pulses as the wireless signal. The light pulses may be emitted at a frequency which may not be visible to the human eye. For instance, the light pulses may be emitted at a frequency greater than 80 Hz. By emitting light pulses of different lengths over periods of time, a signal emitted by a signal emitter device of an electrically powered scooter may code information in the wireless signal where different information corresponds to different lengths of light pulses. Other techniques for coding information within light pulses within the skill of one with ordinary skill in the art may also be used.

The information encoded into the wireless signal may include supplemental information in addition to information that indicates or is based at least in part on operator proficiency. Examples of supplemental information may include information that corresponds to: the electrically powered scooter (e.g., type, age, operating capabilities, or other descriptive information of the scooter); the operator of the electrically powered scooter (e.g., operator history, operator demographics, information from an operator profile stored by an operator of a service for the electrically powered scooter or other descriptive information of the operator of the electrically powered scooter); the environment of the electrically powered scooter (e.g., pathway surface quality, pathway surface type, complexity of pathway; weather for pathway or other descriptive information of the pathway); other operators or vehicles of operators near the operator of the electrically powered scooter (e.g., operator proficiency of other operators, vehicle type, vehicle operating capabilities, or other descriptive information of operators or vehicles of operators near the operator of the electrically powered scooter); and/or other infrastructure articles in proximity to the electrically powered scooter (e.g., type, age, applicability to electrically powered scooters).

In accordance with techniques of this disclosure, computing device 116A and/or one or more other computing devices (e.g., remote computing system 150 in FIG. 2) may generate, store, process, and/or send/receive information that indicates an operator proficiency of an operator for an electrically powered scooter. In some examples, operatory proficiency may refer to a competence, experience, skill or comfort of the operator when using an electrically powered scooter. For instance, operatory proficiency may be based at least in part on: a quantity of rides driven by the operator, a cumulative distance driven by the operator, or whether the operator is operating within a designated region for the operator, to name only a few examples. In some examples, operator proficiency of the operator is based at least in part on whether the operator experienced a risk event during prior operation of one or more electrically powered scooters. A risk event may be an accident or a near-miss of an accident, or an unexpected event during operation of an electrically powered scooter.

Information indicating operator proficiency may be generated by one or more of: a computing device associated with the operator, a computing device associated with the electrically powered scooter, a computing device associated with other vehicles in proximity to the operator, infrastructure articles in proximity to the operator, or one or more other computing devices (e.g., remote computing device 150 in FIG. 2) that process data used to indicate operator proficiency. One or more sensors may be used to generate information indicating operator proficiency, such as but not limited to: accelerometers, image capture devices, wireless sensors (e.g., Wifi, Bluetooth, RFID, DSCR and the like), impact sensors, speedometers, gyroscopes, magnetometers, and the like. By generating and collecting this data, a computing device may determine, for example, a quantity of rides driven by the operator, a cumulative distance driven by the operator, whether the operator experienced a risk event, or any other examples of operator proficiency.

Information that indicates operator proficiency may be coded into a wireless signal that is sent from a computing device associated with the electrically powered scooter or operator to the infrastructure article such as pavement marking 128E. In some examples, the information that indicates operator proficiency is generated at the computing device associated with the electrically powered scooter or operator to the infrastructure article and send to pavement marking 128E. In some examples, the information that indicates operator proficiency is received from a remote computing device at the computing device associated with the electrically powered scooter or operator to the infrastructure article and sent to pavement marking 128E. In some examples, the information that indicates operator proficiency is received by pavement marking 128E from a remote computing device without being sent via the computing device associated with the electrically powered scooter or operator to the infrastructure article.

An infrastructure article, such as pavement marking 128E may receive the wireless signal which includes the information that indicates operator proficiency and perform, based at least in part on the information that indicates the operator proficiency of the operator of the electrically powered scooter, at least one operation. In some examples, the information included in the wireless signal may be a metric, such as a discrete or non-discrete value in a set or range of values that indicates operator proficiency. In some examples, the information included in the wireless signal may be based on operator proficiency but the information itself may not indicate operator proficiency. For instance, the information included in the wireless signal may indicate a command to be performed by pavement marking 128E based at least in part on operator proficiency. In any case, pavement marking 128E may receive the wireless signal and perform one or more operations based on operator proficiency.

Pavement marking 128E may generate an output that is based at least in part on the information that indicates the operator proficiency of the operator of the electrically powered scooter. For instance, the output may be at least one of a visible output, an audible output, a motion-based output, or communication output (e.g., sending a wireless signal). The output may be based at least in part on the information that indicates the operator proficiency of the operator of the electrically powered scooter. For instance, the type of output may be based at least in part on the information that indicates the operator proficiency of the operator of the electrically powered scooter. Examples of types of output for a visual output may be color, light intensity, emitting frequency (e.g., outputs per second) may be based on operator proficiency of the operator of the electrically powered scooter. Types of output for audible output may be amplitude, frequency, or any audio property, any of which may be based on operator proficiency of the operator of the electrically powered scooter. Types of output for haptic output may be intensity, frequency, or any haptic property, any of which may be based on operator proficiency of the operator of the electrically powered scooter.

In some instances, pavement marking 128E is configured in a set of infrastructure articles 128A-128F, and whether to generate output 128E is based at least in part on whether one or more other infrastructure articles of the set of infrastructure articles generate a respective output. For instance, if an operator proficiency is high within a range or set of operator proficiencies, pavement marking 128E may not generate an output if one or more other infrastructure articles in proximity to pavement marking 128E generate an output. Such techniques may save power when it may not be necessary to generate an output at each of infrastructure articles 128A-128F because the operator has a higher level of operator proficiency.

Figure 2:
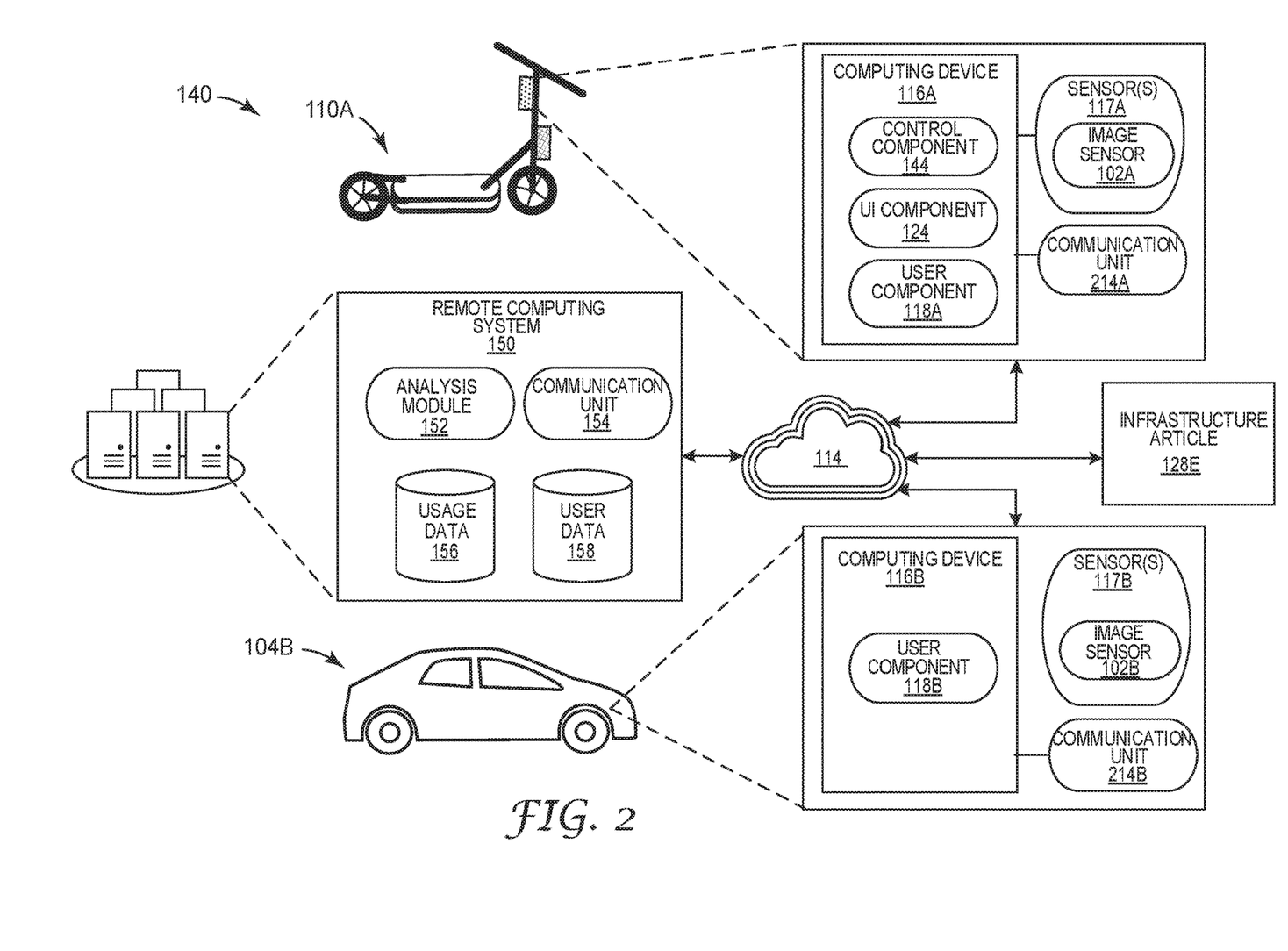
FIG. 2 is a block diagram illustrating an example system for improving safety associated with an electrically powered scooter based at least in part on operator proficiency, in accordance with techniques of this disclosure.

An infrastructure article, such as pavement marking 128E, that is configured in accordance with techniques of this disclosure may be configured to send a message to one or more computing devices associated with one or more electrically powered scooters. For instance, pavement marking 128E may send one or more messages to electrically powered scooters 110A and/or 110B. In some examples, computing device 116A may send one or more messages to one or more vehicles, infrastructure articles, or remote computing devices (e.g., remote computing system 150). The one or more messages may be based at least in part on an operator proficiency of an operator of electrically powered scooter 116A. In some examples, the message is based at least in part on one or more properties of an environment that includes the infrastructure article.

In some examples, an infrastructure article, such as pavement marking 128E may be configured to perform an operation based at least in part on a plurality of wireless signals received at the infrastructure article. For instance, pavement marking 128E, in response to receiving wireless signals from electrically powered scooters 110A and 110B may perform an operation based at least in part on determination that multiple wireless signals were received at the infrastructure article. As an example, the type of output may change based on the determination that multiple wireless signals were received at the infrastructure article, although any operations are possible. In some examples, pavement marking 128E, in response to a plurality of wireless signals received at the infrastructure article, may send wireless signals to one or more scooters, vehicles, pedestrians, infrastructure articles or other receivers, that indicate the operator proficiency of one or a set of the operators.

In some examples, an infrastructure article, such as pavement marking 128E may perform at least one operation based at least in part on a determination by the controller of pavement marking 128E that electrically powered scooter 110A is approaching the infrastructure article. For instance, pavement marking 128E may determine that electrically powered scooter 110A is approaching the infrastructure article based on a speed, direction, or receipt of a wireless signal from electrically powered scooter 110A. In this way, pavement marking 128E may perform one or more operations prior to electrically powered scooter 110A arriving at or near the location of pavement marking 128E. In some examples, an infrastructure article, such as pavement marking 128E may perform at least one operation based at least in part on a determination by the controller of pavement marking 128E that electrically powered scooter 110A is departing away from the infrastructure article. For instance, pavement marking 128E may determine that electrically powered scooter 110A is departing away from the infrastructure article based on a speed, direction, or receipt of a wireless signal from electrically powered scooter 110A. In this way, pavement marking 128E may perform one or more operations after electrically powered scooter 110A has departed at or near the location of pavement marking 128E. In some examples, pavement marking 128E may perform the at least one operation based at least in part on an angularity of the wireless signal received at the infrastructure article. For example, pavement marking 128E may determine an angularity of a wireless signal, such as an angle relative to an axis that originates at pavement marking 128E, a sensor, and/or an electrically powered scooter. In some examples, pavement marking 128E may perform different operations based on different angles at which the wireless signal is received. In some examples, pavement marking 128E may include one or more retroreflectors.

While computing device 116A is described as dynamically controlling scooter 110A, techniques of this disclosure may enable a computing device to control any other type of micro-mobility device, such as a powered food-delivery device, hoverboard, or skateboard. In still other examples, techniques of this disclosure may enable a computing device to control any other type of vehicle, such as an automobile.

FIG. 2 is a block diagram illustrating an example system for improving safety associated with an electrically powered scooter based at least in part on operator proficiency, in accordance with techniques of this disclosure. System 140 illustrates additional details of system 100 of FIG. 1. In the examples of FIG. 2, system 140 includes electrically powered scooter 110A, vehicle 104B, and a remote computing system 150. In some examples, the devices shown in FIG. 2 are communicatively coupled to one another via network 114. In some examples, the devices shown in FIG. 2 are communicatively coupled to one another directly, for example, via a DSRC transceiver.

Electrically powered scooter 110A includes computing device 116A and vehicle 104B includes computing device 116B. Computing devices 116A, 116B (collectively, computing devices 116) may each include one or more communication unit 214A, 214B, and sensors 117A, 117B, respectively. Although computing device 116A is shown as attached to electrically powered scooter 110A, in other examples, functionality of computing device 116A may be included in a computing device (e.g., smartphone, smartwatch, wearable, or other portable computing device) that is associated with the operator of an electrically powered scooter 100. In such examples, computing device 116A and the computing device that is associated with the operator of electrically powered scooter 100 may communicate with one another and/or one or more other computing devices.

Communication units 214A, 214B (collectively, communication units 214) of computing devices 116 may communicate with external devices by transmitting and/or receiving data. For example, computing device 116 may use communication units 214 to transmit and/or receive radio signals on a radio network such as a cellular radio network or other networks, such as networks 114. In some examples communication units 214 may transmit and receive messages and information to other vehicles, such as information interpreted from infrastructure article 107. In some examples, communication units 214 may transmit and/or receive satellite signals on a satellite network such as a Global Positioning System (GPS) network. In some examples, communications units 214 may transmit and/or receive data through network 114 to remote computing system 150 via communication unit 154.

Sensors 117A, 117B (collectively, sensors 117) may be image sensors 102A, 102B (collectively, image sensors 102), temperature sensors, LiDAR, or a combination thereof, to name only a few examples of sensors. Examples of image sensors 102 may include semiconductor charge-coupled devices (CCD) or active pixel sensors in complementary metal-oxide-semiconductor (CMOS) or N-type metal-oxide-semiconductor (NMOS, Live MOS) technologies. Digital sensors include flat panel detectors. In one example, electrically powered scooter 110A or vehicle 104B includes at least two different sensors for detecting light in two different wavelength spectra. Image sensors 102 may have a fixed field of view or may have an adjustable field of view. An image sensor 102 with an adjustable field of view may be configured to pan left and right, up and down relative to electrically powered scooter 110 or vehicle 104B as well as be able to widen or narrow focus. In some examples, image sensors 102 may include a first lens and a second lens. Electrically powered scooter 110 and/or vehicle 104B may have more or fewer image sensors 102 in various examples.

In the example of FIG. 2, computing device 116A includes a user component 118, a user interface (UI) component 124, and a control component 144. Components 118A, 124, and 144 may perform operations described herein using software, hardware, firmware, or a mixture of both hardware, software, and firmware residing in and executing on computing device 116 and/or at one or more other remote computing devices. In some examples, components 118A, 124, and 144 may be implemented as hardware, software, and/or a combination of hardware and software.

Computing device 116A may execute components 118A, 124, and 144 with one or more processors. Computing device 116A may execute any of components 118A, 124, 144 as or within a virtual machine executing on underlying hardware. Components 118A, 124, 144 may be implemented in various ways. For example, any of components 118A, 124, 144 may be implemented as a downloadable or pre-installed application or "app." In another example, any of components 118A, 124, 144 may be implemented as part of an operating system of computing device 116.

UI component 124 may include any hardware or software for communicating with a user of electrically powered scooter 110. In some examples, UI component 124 includes outputs to a user such as displays, such as a display screen, indicator or other lights, audio devices to generate notifications or other audible functions, and/or haptic feedback devices. UI component 124 may also include inputs such as knobs, switches, keyboards, touch screens or similar types of input devices.

In general, sensors 117 may be used to gather information about infrastructure proximate to electrically powered scooter 110A and vehicle 104B, such as information about transportation pathways 106. Sensors 117 may generate infrastructure data indicative of the infrastructure proximate to electrically powered scooter 110A or vehicle 104B. For example, image sensors 102 may capture images of infrastructure articles, such as lane markings, centerline markings, edge of roadway or shoulder markings, as well as the general shape of the transportation pathway. The general shape of a transportation pathway may include turns, curves, incline, decline, widening, narrowing or other characteristics.

Computing device 116A may include a user component 118A configured to perform techniques of this disclosure.

For example, user component 118A may receive data that indicates operator proficiency from one or more other devices, such as but not limited to remote computing system 150, computing device 116B, and/or infrastructure article 128E. In some examples, user component 118A may receive data from sensors 117A and/or communication unit 214A that indicate operator proficiency or may be used to generator data indicating operator proficiency. User component 118A may cause communication unit 214A to send and receive data indicating operator proficiency with another device such as remote computing system 150. As further described herein, remote computing system 150 may store usage data for micromobility devices and/or user data associated with operators of micromobility devices.

In the example of FIG. 2, user component 118A may cause communication unit 214A to code information in a wireless signal that indicates operator proficiency. Communication unit 214A may send the wireless signal to infrastructure article 128E, which may change its operation based at least in part on the operator proficiency. Operations that may be performed by infrastructure article 128E are described throughout this disclosure, such as but not limited to, generating an output or sending data to another device.

Control component 144 may be configured to perform an operation by adjusting operation of electrically powered scooter 110A. Control component 144 may include, for example, any circuitry or other hardware, or software that may adjust one or more functions of the vehicle. Some examples include adjustments to change a speed of electrically powered scooter 110A, shut off an electric motor that drives one or more wheels, or both. In some examples, control component 144 may be configured based at least in part on operator proficiency such that operation of electrically powered scooter 110A is based on operator proficiency. Control component 144 may perform operations based at least in part on data received from infrastructure article 128E. In some examples, control component 144 adjusts operation of the electric motor of electrically powered scooter 110A. For example, control component 144 may cause the electric motor to slow down or stop, which may slow or stop the electrically powered scooter 110A. In another example, control component 144 causes a brake apparatus to slow or stop electrically powered scooter 110A. As yet another example, control component 144 may adjust a maximum allowable speed of electrically powered scooter 110A.

UI component 124 may perform the at least one operation by generating an output. For example, the output may include an audio output, a visual output, a haptic output, or a combination thereof. As one example, computing device 116A may output a visual alert via one or more LED lights or output a haptic alert (e.g., causing the steering assembly to vibrate) indicating that electrically powered scooter 110A is not permitted in its current location.

Remote computing system 150 may include a distributed computing platform (e.g., a cloud computing platform executing on various servers, virtual machines and/or containers within an execution environment provided by one or more data centers), physical servers, desktop computing devices, or any other type of computing system. In some examples, communication unit 214 of computing device 116 of electrically powered scooter 110A outputs messages or other data to a remote computing device, such as remote computing system 150. In some examples, the message indicates usage data for electrically powered scooter 110A. The usage data may include a current location of electrically powered scooter 110A, whether the current location of electrically powered scooter 110A is permitted, a type of the current location (e.g., a transportation pathway 106, a park, a scooter parking zone, etc.), an amount of time that electrically powered scooter 110A has been in its current location, information indicating the occurrence of a scooter-specific event, among other information. In some examples, the user data may include data about operator proficiency as described in this disclosure. That is, the data about operator proficiency may be data from sensors 117A, communication unit 214A or other components illustrated or not illustrated in FIG. 2. Data about operator proficiency may also be generated by computing device 116A based at least in part on data from sensors 117A, communication unit 214A or other components illustrated or not illustrated in FIG. 2.

Remote computing system 150 may receive the message from computing device 116A. The message may include usage data associated with electrically powered scooter 110A. Analysis module 152 of remote computing system 150 may store the usage data within usage data 156. For example, analysis module 152 may store a user account for each user of electrically powered scooters 110 within user data 158. The user account may include information indicating whether the user complied with various scooter operating rules, such as complying with speed limits, operating electrically powered scooter 110A in prohibited locations, or parking electrically powered scooter 110A within a pre-defined set of delineated parking regions. The user account may include information indicating an operator proficiency of the user. In some examples, analysis module 152 may send operator proficiency data to one or more other devices, such as computing device 116A, infrastructure article 128E, computing device 116B or any other devices.

While user component 118A of computing device 116A is described as performing various functionality of computing device 116A, in some examples, user component 118B of computing device 116B may perform similar functionality. For example, user component 116B may determine an operator proficiency of a vehicle operator based on data from one or more of sensors 117B and/or communication unit 214B, either of which may interact with infrastructure article 128E. In some examples, user component 118B may receive data indicating an operator proficiency of electrically powered scooter 110A from one or more devices, such as infrastructure article 128E, computing device 116A, and/or remote computing system 150.

Figure 3:
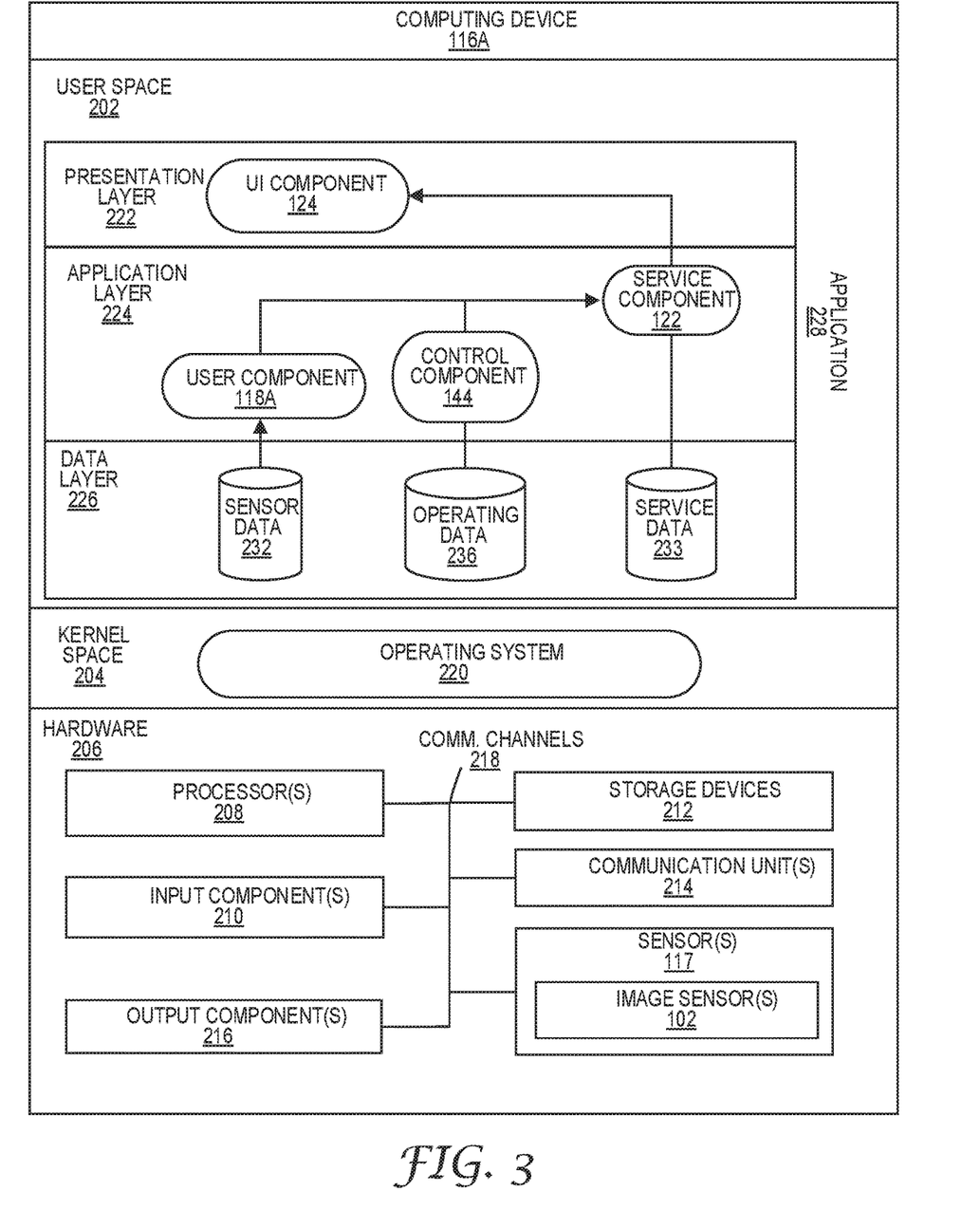
FIG. 3 is a block diagram illustrating an example computing device, in accordance with one or more aspects of the present disclosure.

FIG. 3 is a block diagram illustrating an example computing device, in accordance with one or more aspects of the present disclosure. FIG. 3 illustrates only one example of a computing device. Many other examples of computing device 116A may be used in other instances and may include a subset of the components included in example computing device 116A or may include additional components not shown in example computing device 116A in FIG. 3.

As shown in the example of FIG. 3, computing device 116A may be logically divided into user space 202, kernel space 204, and hardware 206. Hardware 206 may include one or more hardware components that provide an operating environment for components executing in user space 202 and kernel space 204. User space 202 and kernel space 204 may represent different sections or segmentations of memory, where kernel space 204 provides higher privileges to processes and threads the user space 202. For instance, kernel space 204 may include operating system 220, which operates with higher privileges than components executing in user space 202.

As shown in FIG. 3, hardware 206 includes one or more processors 208, input components 210, storage devices 212, communication units 214, output components 216, and sensors 117. Processors 208, input components 210, storage devices 212, communication units 214, output components 216, and sensors 117 may each be interconnected by one or more communication channels 218. Communication channels 218 may interconnect each of the components 208, 210, 212, 214, 216, and 117 and other components for inter-component communications (physically, communicatively, and/or operatively). In some examples, communication channels 218 may include a hardware bus, a network connection, one or more inter-process communication data structures, or any other components for communicating data between hardware and/or software.

One or more processors 208 may implement functionality and/or execute instructions within computing device 116A. For example, processors 208 on computing device 116A may receive and execute instructions stored by storage devices 212 that provide the functionality of components included in kernel space 204 and user space 202. These instructions executed by processors 208 may cause computing device 116A to store and/or modify information, within storage devices 212 during program execution. Processors 208 may execute instructions of components in kernel space 204 and user space 202 to perform one or more operations in accordance with techniques of this disclosure. That is, components included in user space 202 and kernel space 204 may be operable by processors 208 to perform various functions described herein.

One or more input components 210 of computing device 116A may receive input. Examples of input are tactile, audio, kinetic, and optical input, to name only a few examples. Input components 210 of computing device 116A, in one example, include a voice responsive system, video camera, buttons, control pad, microphone or any other type of device for detecting input from a human or machine. In some examples, input component 210 may be a presence-sensitive input component, which may include a presence-sensitive screen, touch-sensitive screen, etc.

One or more communication units 214 of computing device 116A may communicate with external devices by transmitting and/or receiving data. For example, computing device 116A may use communication units 214 to transmit and/or receive radio signals on a radio network such as a cellular radio network. In some examples, communication units 214 may transmit and/or receive satellite signals on a satellite network such as a Global Positioning System (GPS) network. Examples of communication units 214 include a DSRC transceiver, an optical transceiver, a radio frequency transceiver, a GPS receiver, or any other type of device that can send and/or receive information. Other examples of communication units 214 may include Bluetooth®, GPS, 3G, 4G, and Wi-Fi® radios found in mobile devices as well as Universal Serial Bus (USB) controllers and the like.

One or more output components 216 of computing device 116A may generate output. Examples of output are tactile, audio, and video output. Output components 216 of computing device 116A, in some examples, include a presence-sensitive screen, sound card, video graphics adapter card, speaker, cathode ray tube (CRT) monitor, liquid crystal display (LCD), or any other type of device for generating output to a human or machine. Output components may include display components such as a liquid crystal display (LCD), a Light-Emitting Diode (LED) or any other type of device for generating tactile, audio, and/or visual output. Output components 216 may be integrated with computing device 116A in some examples.

In other examples, output components 216 may be physically external to and separate from computing device 116A but may be operably coupled to computing device 116A via wired or wireless communication. An output component may be a built-in component of computing device 116A located within and physically connected to the external packaging of computing device 116A (e.g., a screen on a mobile phone). In another example, a presence-sensitive display may be an external component of computing device 116A located outside and physically separated from the packaging of computing device 116A (e.g., a monitor, a projector, etc. that shares a wired and/or wireless data path with a tablet computer).

Output components 216 may also include control component 144, in examples where computing device 116A is onboard an electrically powered scooter. Control component 144 has the same functions as control component 144 described in relation to FIG. 1.

One or more storage devices 212 within computing device 116A may store information for processing during operation of computing device 116A. In some examples, storage device 212 is a temporary memory, meaning that a primary purpose of storage device 212 is not long-term storage. Storage devices 212 on computing device 116A may configured for short-term storage of information as volatile memory and therefore not retain stored contents if deactivated. Examples of volatile memories include random access memories (RAM), dynamic random-access memories (DRAM), static random-access memories (SRAM), and other forms of volatile memories known in the art.

Storage devices 212, in some examples, also include one or more computer-readable storage media. Storage devices 212 may be configured to store larger amounts of information than volatile memory. Storage devices 212 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage devices 212 may store program instructions and/or data associated with components included in user space 202 and/or kernel space 204.

As shown in FIG. 3, application 228 executes in user space 202 of computing device 116A. Application 228 may be logically divided into presentation layer 222, application layer 224, and data layer 226. Presentation layer 222 may include user interface (UI) component 124, which generates and renders user interfaces of application 228. Application 228 may include, but is not limited to: UI component 124, user component 118A, security component 120, and one or more service components 122. For instance, application layer 224 may include user component 118A, service component 122, and security component 120. Presentation layer 222 may include UI component 124.

Data layer 226 may include one or more datastores. A datastore may store data in structure or unstructured form. Example datastores may be any one or more of a relational database management system, online analytical processing database, table, or any other suitable structure for storing data.

Service data 233 may include any data to provide and/or resulting from providing a service of service component 122. For instance, service data 233 may include information about infrastructure articles 107, user information, operating rule sets, or any other information transmitted between one or more components of computing device 116A. Operating data 236 may include instructions for scooter operating rule sets for operating electrically powered scooter 110A.

Sensor data 232 may include infrastructure data, such as image data, signature data, or any other data indicative of infrastructure proximate to electrically powered scooter 110A. For example, communication units 214 may receive, from an image sensor 102, image data indicative of infrastructure proximate to electrically powered scooter 110A and may store the image data in sensor data 232. Image data may include one or more images that are received from one or more image sensors, such as image sensors 102. In some examples, the images are bitmaps, Joint Photographic Experts Group images (JPEGs), Portable Network Graphics images (PNGs), or any other suitable graphics file formats. In some examples, the image data includes images of one or more infrastructure articles 107 of FIG. 1. In one example, the image data includes images of one or more article message 126 associated with one or more infrastructure articles 107.

In some examples, user component 118A causes control component 144 to adjust control of electrically powered scooter 110A based on data received from one or more devices such as a remote computing system or infrastructure article. For example, user component 118A may cause control component 144 to adjust operation of the electric motor and/or adjust operation of the braking assembly (e.g., to adjust a speed of electrically powered scooter 110A). In some examples, user component 118A causes control component 144 to adjust control of electrically powered scooter 110A based on data generated by one or more components or modules in computing device 116A. User component 118A may determine, generate or receive data that indicates an operator proficiency for operating an electrically powered scooter.

In some examples, user component 118A may select information that is based on an operator proficiency of an operator of the electrically powered scooter. User component 118A may code, into a wireless signal, the information that is based on an operator proficiency of an operator of the electrically powered scooter. In some examples, user component 118A may code the information by causing one or more of hardware 206 to convert a digital representation of the information into the wireless signal. For example, one or more of output components 216 and/or communication unit 214 may convert and/or send the wireless signal to one or more other devices. In some examples, the wireless signal may be sent to an infrastructure article configured to receive the wireless signal.

Figure 4:
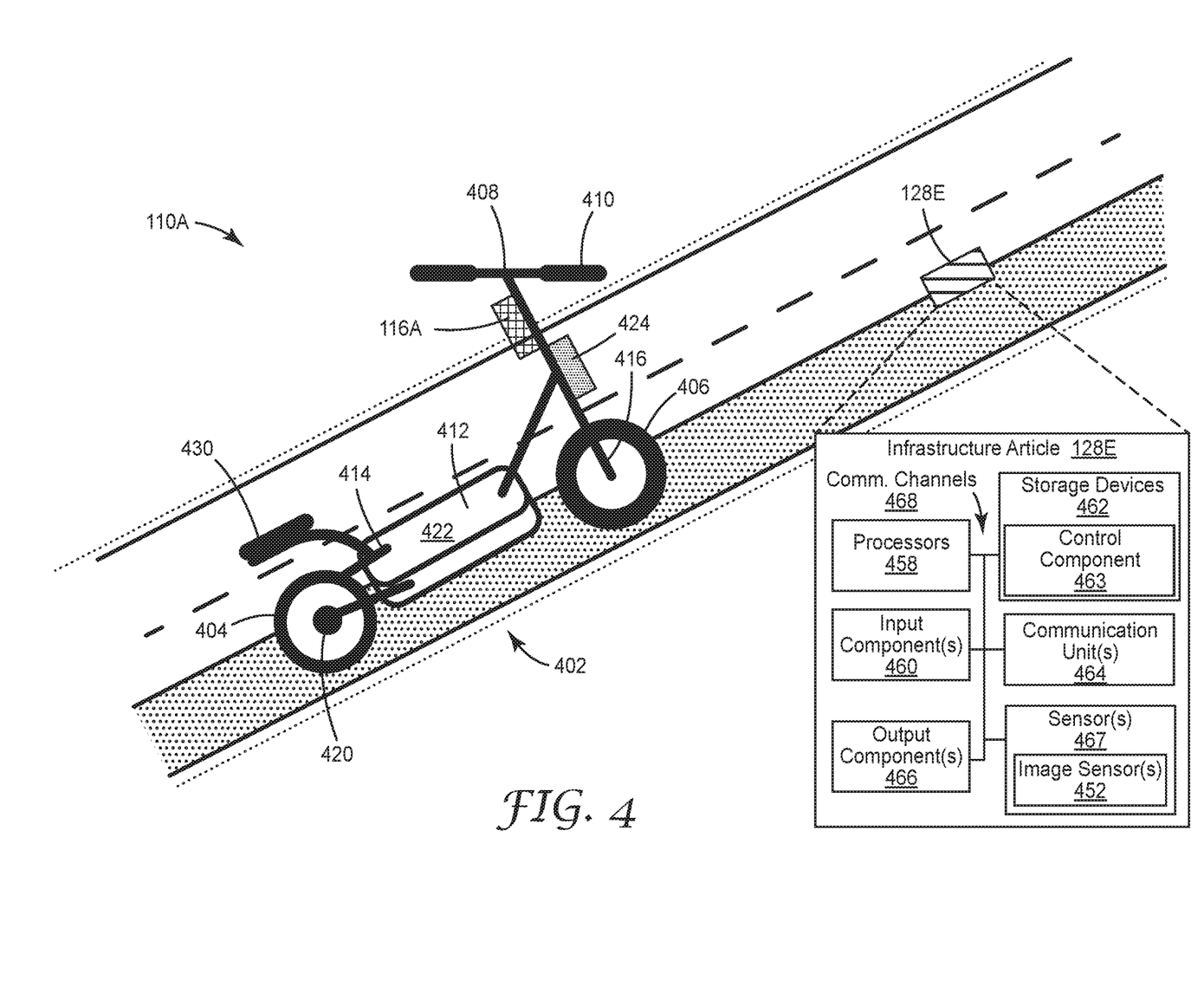
FIG. 4 is a conceptual diagram of an electrically powered scooter, in accordance with techniques of this disclosure.

FIG. 4 is a conceptual diagram of an electrically powered scooter 110A, in accordance with techniques of this disclosure.

Electrically powered scooter 110A include a chassis 402, a rear wheel 404, a front wheel 406, and a steering assembly 408. Chassis 402 includes chassis support member 412 extending substantially horizontally between a rear-wheel mount 414 at one end of chassis 402 and a front-wheel mount 416 at another end of chassis 402 that is opposite the rear-wheel mount 414.

In the example of FIG. 4, rear wheel 404 is mounted to rear wheel mount 414 and front wheel 406 is mounted to front wheel mount 416. Front wheel 406 is mounted to front wheel mount 416 for turning steering movement with respect to the front wheel mount 406 and rear wheel 404. Front wheel mount 416 may be coupled to steering assembly 408. Steering assembly 408 may extend generally vertically relative to chassis support member 412. Steering assembly may be angled relative to chassis support member 412. In one example, an angle between chassis support member 412 and steering assembly 408 is between approximately 60 degrees to approximately 90 degrees. Steering assembly 408 may include handlebars 410. Steering assembly 408 may be coupled to front wheel mount 416 such that turning handlebars 410 may cause front wheel 406 to turn.

Electrically powered scooter 110A includes at least one electric motor 420, at least one motor controller 422, and at least one battery 424. Motor controller 422 may be operatively coupled to electric motor 420 to drive rear wheel 404 and/or front wheel 406. In the example of FIG. 4, electric motor 420 is configured to drive rear wheel 404, in some examples, electric motor 420 may be configured to drive front wheel 406. In one example, electrically powered scooter 110A includes a plurality of motors that are each configured to drive a respective wheel.

Electrically powered scooter 110A may include a braking apparatus 430. In the example of FIG. 4, braking apparatus 430 is operatively coupled to rear wheel 404 to selectively slow and/or stop rear wheel 404. In some examples, electrically powered scooter 110A includes a braking apparatus coupled to front wheel 406.

FIG. 4 illustrates a block diagram of components of infrastructure article 128E, in accordance with one or more aspects of the present disclosure. FIG. 4 illustrates only one example of a computing device. Many other examples of infrastructure article 128E may be used in other instances and may include a subset of the components included in example infrastructure article 128E or may include additional components not shown in example infrastructure article 128E in FIG. 4.

As shown in FIG. 4, infrastructure article 128E includes one or more processors 458, input components 460, storage devices 462, communication units 464, output components 466, and sensors 467. Processors 458, input components 460, storage devices 462, communication units 464, output components 466, and sensors 467 may each be interconnected by one or more communication channels 468. Communication channels 468 may interconnect each of the components 458, 460, 462, 464, 466, and 467 and other components for inter-component communications (physically, communicatively, and/or operatively). In some examples, communication channels 468 may include a hardware bus, a network connection, one or more inter-process communication data structures, or any other components for communicating data between hardware and/or software.

One or more processors 458 may implement functionality and/or execute instructions within infrastructure article 128E. For example, processors 458 on infrastructure article 128E may receive and execute instructions stored by storage devices 462 that provide the functionality of components included in storage devices 462. These instructions executed by processors 458 may cause infrastructure article 128E to store and/or modify information, within storage devices 462 during program execution. Processors 458 may execute instructions of components in storage devices 462 to perform one or more operations in accordance with techniques of this disclosure. That is, components included in storage devices 462 may be operable by processors 458 to perform various functions described herein. In some examples, processor 458 and storage devices 462 interoperating as a logical component may be referred to as a controller of infrastructure article 128E.

One or more input components 460 of infrastructure article 128E may receive input. Examples of input are tactile, audio, kinetic, electromagnetic (e.g., wireless signals) and optical input, to name only a few examples. Input components 460 of infrastructure article 128E, in one example, include a, audio responsive system, video camera, buttons, control pad, microphone, pressure input device, light capture device, or any other type of device for detecting input from a human or machine or environment. In some examples, input component 460 may be a presence-sensitive input component, which may include a presence-sensitive screen, touch-sensitive screen, etc.

One or more communication units 464 of infrastructure article 128E may communicate with external devices by transmitting and/or receiving data. For example, infrastructure article 128E may use communication units 464 to transmit and/or receive radio signals on a radio network such as a cellular radio network. In some examples, communication units 464 may transmit and/or receive satellite signals on a satellite network such as a Global Positioning System (GPS) network. Examples of communication units 464 include a DSRC transceiver, an optical transceiver, a radio frequency transceiver, a GPS receiver, or any other type of device that can send and/or receive information. Other examples of communication units 464 may include Bluetooth®, GPS, 3G, 4G, and Wi-Fi® radios found in mobile devices as well as Universal Serial Bus (USB) controllers and the like.

One or more output components 466 of infrastructure article 128E may generate output. Examples of output are haptic, audio, electromagnetic (e.g., wireless signals), and visual output to name only a few examples. Output components 466 of infrastructure article 128E, in some examples, include a presence-sensitive screen, sound card, video graphics adapter card, speaker, cathode ray tube (CRT) monitor, liquid crystal display (LCD), or any other type of device for generating output to a human or machine or environment. Output components may include display components such as a liquid crystal display (LCD), a Light-Emitting Diode (LED) or any other type of device for generating tactile, audio, and/or visual output. Output components 466 may be integrated with infrastructure article 128E in some examples.

In other examples, output components 466 may be physically external to and separate from infrastructure article 128E but may be operably coupled to infrastructure article 128E via wired or wireless communication. An output component may be a built-in component of infrastructure article 128E located within and physically connected to the external packaging of infrastructure article 128E. In another example, output components 466 may be external components of infrastructure article 128E located outside and physically separated from the packaging of infrastructure article 128E. Output components 466 may also include control component 463, which may perform techniques of this disclosure described with respect to infrastructure article 128E.

One or more storage devices 462 within infrastructure article 128E may store information for processing during operation of infrastructure article 128E. In some examples, storage device 462 is a temporary memory, meaning that a primary purpose of storage device 462 is not long-term storage. Storage devices 462 on infrastructure article 128E may configured for short-term storage of information as volatile memory and therefore not retain stored contents if deactivated. Examples of volatile memories include random access memories (RAM), dynamic random-access memories (DRAM), static random-access memories (SRAM), and other forms of volatile memories known in the art.

Storage devices 462, in some examples, also include one or more computer-readable storage media. Storage devices 462 may be configured to store larger amounts of information than volatile memory. Storage devices 462 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage devices 462 may store program instructions and/or data associated with components included in storage devices 462.

In some examples, an infrastructure article may receive a signal from a micromobility device, determine the source of the micromobility device based on the micromobility signal relative to the infrastructure article, determine at least one state of the micromobility device, and perform an operation based on the location of the source relative to the micromobility or relative to the infrastructure article location and the micromobility state. Techniques and systems of this disclosure may enable improved tracking and compliance of micromobility devices related to enabling city regulations directed towards safe operation and storage of micromobility devices in urban environments. Additionally, such signals could be used to trigger an infrastructure response or a micromobility device response in high risk areas such as intersections. These techniques and systems may enable more accurate and more trustworthy localization of micromobility devices.

In some examples, system includes a pulsed light source on a micromobility device where the light travels to an infrastructure article that receives the light and directs it back towards the sources where the light is received by a camera. The distance from the micromobility device to the infrastructure article may be calculated by time of flight. In some examples, the light may be altered by the infrastructure article to indicates state information about the infrastructure article, which may include the location or region or the infrastructure article. In some examples, the micromobility device may send a light or radio signal that is received by an element of the infrastructure that changes in response to the signal, for example, blinking lights across an intersection.

In some instances, micromobility usage may be tracked with GPS or cellular signals which may not be accurate or precise depending on natural challenges and incentivized challenges. Tracking micromobility rider location provides information on the ending and potential starting points of a micromobility device as well as a potential compliance metrics with city ordinances. If the systems are not accurate or precise, the metrics and decisions made from those metrics become less meaningful. This could result in dissatisfied customers, or cause rise of potential safety issues. Micromobility devices may have battery/electric systems capable of emitting a pulse of energy that can be used to increase the visibility of the micromobility device to other roadway users.

GPS may have challenges with providing high resolution location information and potentially any information in urban canyons, which may be an operating environment for micromobility devices. Another approach used to track micromobility devices is with the use of cellular signals. Cell signals may locate a micromobility device using triangulation when there are three towers within line of sight of the mobile and can locate the distance of a mobile from a tower when there is only one tower within line of sight. Location may be computed via a measure of the signal strength from any cellular towers within range. Several factors including, bounces in the signal path and traveling through absorbing or scattering media (such as walls or building materials) may influence the result and often cause some unknown amount of error in the location determination. A combination of these modalities may be used to increase the overall accuracy and can act as a redundant measure in challenging environments, however, techniques of this disclosure may augment and improve location finding in the midst of these challenges.

Even when in specified lanes, micromobility devices may not be visible to vehicle drivers, especially when the vehicles are turning across the special use lanes at intersections. By triggering a response in an upcoming intersection, either via the infrastructure or via the micromobility device, the micromobility device can create additional awareness to larger roadway users.

Micromobility devices that are charged a fee based on miles driven may be incentivized to use a GPS spoofer or jammer, resulting in the user to ride it for free or for a decreased fee. Without GPS for location finding, other approaches may attempt to use an accelerometer for positional tracking, however the calculation may introduce errors due to the integration of an unknown constant term when attempting to dead reckon by calculating position from acceleration measurements.

Municipalities may enact regulations to meet the city demand for micromobility devices while also maintaining public safety and the character or appeal of the city. Public safety depends often on how and where the micromobility devices are operated. In some cases, where they are parked may also impact safety, as is true in the example where a micromobility device is parked in the middle of a street. The character or appeal of the city may be more impactful with dockless micromobility device where they may be parked and amassed in any location to the point where it impacts the appearance of the city and potentially pedestrian and vehicle congestion.

In some examples, micromobility service providers that manage fleets of micromobility devices may benefit from a fiducial marking system in localizing and determining the location of the micromobility device. Techniques of this disclosure may use fiducials and systems for enabling more meaningful enforcement of regulations. Micromobility service providers may be incentivized to ensure the safety of micromobility users and other roadway users as their systems become more prominent in urban environments. Additional safety capabilities could increase the acceptance of micromobility devices in the busy, mixed-user environment in a city.

Regulations may drive improvement of infrastructure materials to enable accurate and reliable usage and tracking of micromobility devices. With a technology that is less sensitive to natural and incentivized challenges as more reliable availability and operations may be important to the success and adoption of micromobility devices in urban environments.

Localizing a micromobility device in an environment where standard localization techniques may not be adequate (e.g. cellular triangulation, GPS, dead reckoning, pure SLAM) may improve safety. Possible deficiencies in standard methods (GPS, Cellular Triangulation) were described in the background summary. In addition to those challenges, a micromobility device is faced with and additional challenge of being a relatively low power device (when compared to a gasoline or even electric vehicle) and this provides real constraints on power consumption and compute capability. Another way of performing localization may include using SLAM with naturally occurring fiducials. This is challenging in automotive let alone in the micromobility device space. The state-of-the-art techniques for performing SLAM include LiDAR or a heavy lifting camera system. Both solutions are expensive (in all senses of the word: money, power, and computational) and they both require some amount of stability assuming that you are not going to continuously run them because of battery capacity.

Techniques and systems of this disclosure may improve power consumption and power requirements, while still being able to aid in localization at a manageable interval. Such techniques and systems may utilize passive or active uniquely identified fiducial markers to help locate micromobility devices and to share information about the location of the infrastructure article (e.g., in an urban environment).

Various examples of a distributed fiducial and interface device (reader, camera etc) are included in this disclosure. For example, a system using a pulsed light and camera with reduced duty cycle may use a passive marker in an infrastructure article and a pulsed light signal with a camera with a low refresh rate. In some examples, a frame rate could be 1 frame a second and still not miss a code at full speed. In this embodiment the micromobility device may relay information about the surrounding environment to a database. The fiducials could be positioned on an infrastructure article. The fiducials could be positioned on pavement markings or signage, or other environmental objects. This system may utilize any of the human visible or human invisible technologies from other disclosures (IR, Polarized, Wavelength signature, visible, etc.)

A pulsed light camera system may also be used to send a signal to an infrastructure receiver (e.g. an infrastructure article) that triggers a response in the environment. For example, the light energy signal (visible or IR) could be received at the edge of an intersection triggering a lighted "path" across the intersection that warns turning vehicles about an oncoming micromobility device. The receiver could also be on a curb, a structure or a vehicle.

In some examples, an encoded blinking infrastructure article may provide a non-perceptible blink rate (e.g., at 500 hz or a rate greater than 450 hz) which could be detected by a photodiode at a signal receiver device and decoded to reveal a unique ID. The blinking could be modulated by many different schemes: amplitude, frequency, or more complex schema if necessary. Location can be determined by a computing device if multiple devices are in the field at the same time, particularly if a pattern is known then distance estimation can be calculated. In some examples, extra information can be encoded into these blink patterns. The camera may or may not require a light source on the micromobility device.

In some examples, an infrastructure article, such as a radar readable raised pavement marking could convey information utilizable for localization. In some examples, RFID systems, such as UHF or HF systems, may be designed to enable remote sensing of a unique ID and some small data elements. This implementation may be suited for a micromobility device as line of sight is not required, and the bottom of the scooter is close to the ground and could have an antenna incorporated into the base of the scooter. Any edge line or other pavement marking may have an RFID tag embedded into it (or directly on the road surface) where the micromobility device could read the RFID tags and gain location information as well as other stored info. In such examples, such as system may be more effective if the scooter would drive over the pavement marking (and would potentially work with HF RFID. The reader may be mounted on the belly (e.g., underside) of the scooter. In some examples, Bluetooth low energy devices could be used. In some examples, the low energy Bluetooth device could also be used to trigger a response in the infrastructure when directed.

In some examples, speed of the micromobility device may change behavior its behavior relative to infrastructure articles. In some examples, if a system determines that a rule is being violated consistently or above some threshold frequency, the computing device could recommend an infrastructure change.

Figure 5:
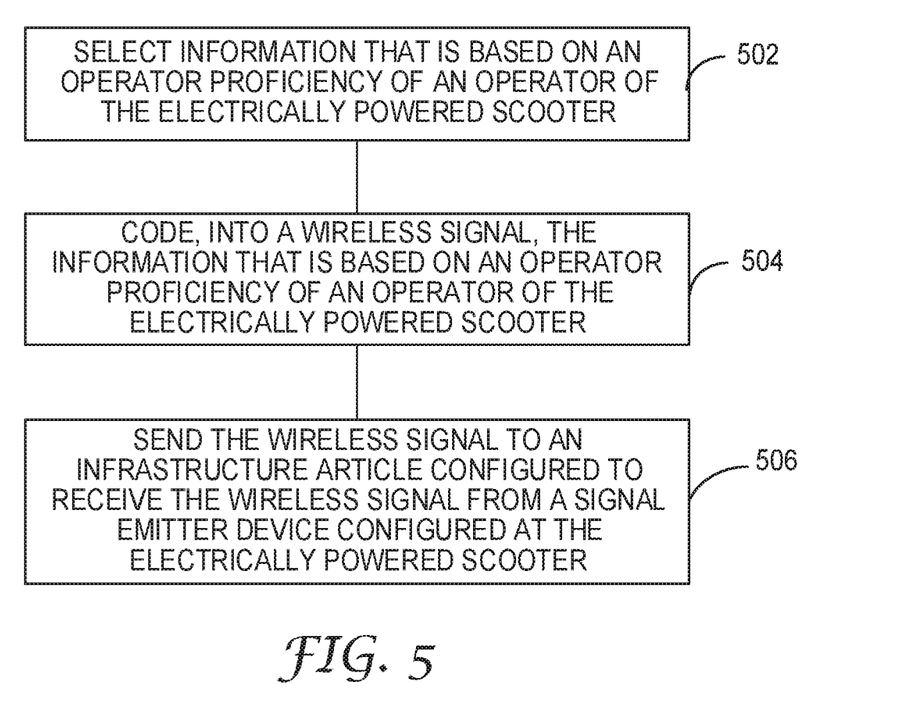
FIG. 5 is a flow diagram illustrating example operations of a computing device that use data for operator proficiency, in accordance with one or more techniques of this disclosure.

FIG. 5 is a flow diagram illustrating example operations of a computing device that use data for operator proficiency, in accordance with one or more techniques of this disclosure. The techniques are described in terms of computing device 116A. However, the techniques may be performed by other computing devices.

In the example of FIG. 5, computing device 116A may select information that is based on an operator proficiency of an operator of the electrically powered scooter (502). As described in this disclosure, the information based on operator proficiency may be generated at a computing device associated with an electrically powered scooter and/or received from a remote computing device not associated with the electrically powered scooter. Computing device 116A may code, into a wireless signal, the information that is based on an operator proficiency of an operator of the electrically powered scooter (504). As described in this disclosure, the wireless signal may be in any suitable form such as RFID, DSRC, Bluetooth, light pulses, or any technique. Computing device 116A may send the wireless signal to an infrastructure article configured to receive the wireless signal from a signal emitter device configured at the electrically powered scooter (506). For example, computing device 116A may cause a signal emitting device to emit the wireless signal in a way that the information may be determined at a signal receiver device from the wireless signal.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, eEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor", as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially.

In some examples, a computer-readable storage medium includes a non-transitory medium. The term "non-transitory" indicates, in some examples, that the storage medium is not embodied in a carrier wave or a propagated signal. In certain examples, a non-transitory storage medium stores data that can, over time, change (e.g., in RAM or cache).

Various examples have been described. These and other examples are within the scope of the following claims.

What is claimed is:

1. An infrastructure article comprising:
  a signal receiver device configured to receive a wireless signal from a signal emitter device configured at an electrically powered scooter;
  a controller configured to:
    determine information, coded in the wireless signal, that is based on an operator proficiency of an operator of the electrically powered scooter; and perform, based at least in part on the information that indicates the operator proficiency of the operator of the electrically powered scooter, at least one operation.

2. The infrastructure article of claim 1, wherein the infrastructure article comprises at least one of a pavement marker configured for attachment to a pathway or a stationary hazard marker configured for attachment to the pathway.

3. The infrastructure article of claim 1, wherein the signal receiver device is a light signal receiver device configured to receive a set of light pulses as the wireless signal.

4. The infrastructure article of claim 3, wherein the light pulses are received at a frequency greater than 80 Hz.

5. The infrastructure article of claim 1, wherein the controller is further configured to perform the at least one operation based at least in part on a determination by the controller that the electrically powered scooter is approaching the infrastructure article.

6. The infrastructure article of claim 1, wherein the infrastructure article is a first infrastructure article, and wherein the controller is configured to:
send, based at least in part on the information that indicates the operator proficiency of the operator of the electrically powered scooter, a message to a second infrastructure article.

7. The infrastructure article of claim 6, wherein the information is first information, and wherein the message comprises second information that is based at least in part on the operator proficiency of the operator of the electrically powered scooter.

8. The infrastructure article of claim 1, wherein the information is first information, the wireless signal is a first wireless signal, the operator proficiency is a first operator proficiency, and the electrically powered scooter is a first electrically powered scooter, wherein the controller is configured to:
determine second information, coded in a second wireless signal received at the infrastructure article, that is based at least in part on a second operator proficiency of a second operator of a second electrically powered scooter.

9. The infrastructure article of claim 1, wherein the information that indicates the operator proficiency of the operator is based at least in part on a quantity of rides driven by the operator, a cumulative distance driven by the operator, or whether the operator is operating within a designated region for the operator.

10. The infrastructure article of claim 1, wherein the information that indicates the operator proficiency of the operator is based at least in part on whether the operator experienced a risk event during prior operation of one or more electrically powered scooters.

11. The infrastructure article of claim 1, wherein to perform the at least one operation, the controller is configured to generate an output that is based at least in part on the information that indicates the operator proficiency of the operator of the electrically powered scooter.

12. The infrastructure article of claim 11, wherein the output comprises at least one of a visible output, an audible output, a motion-based output, or communication output.

13. The infrastructure article of claim 12, wherein at least one of a type or a property of the output is based at least in part on the information that indicates the operator proficiency of the operator of the electrically powered scooter.

14. The infrastructure article of claim 12, wherein the infrastructure article is configured in a set of infrastructure articles, and wherein whether to generate the output is based at least in part on whether one or more other infrastructure articles of the set of infrastructure articles generate a respective output.

15. The infrastructure article of claim 1, wherein the information is first information, the wireless signal is a first wireless signal, the operator proficiency is a first operator proficiency, and the electrically powered scooter is a first electrically powered scooter, wherein the controller is configured to:
send a message to at least one of a computing device associated with the first electrically powered scooter or a second electrically powered scooter.

16. The infrastructure article of claim 1, wherein the message is based at least in part on one or more properties of an environment that includes the infrastructure article.

17. The infrastructure article of claim 1, wherein to perform the at least one operation, the controller is configured to perform the at least one operation based at least in part on a plurality of wireless signals received at the infrastructure article.

18. The infrastructure article of claim 1, wherein to perform the at least one operation, the controller is configured to perform the at least one operation based at least in part on an angularity of the wireless signal received at the infrastructure article.

19. The infrastructure article of claim 1, wherein the infrastructure article comprises a retroreflector.

20. A computing device comprising:
one or more computer processors, and
a memory comprising instructions that when executed by the one or more computer processors cause the one or more computer processors to:
select information that is based on an operator proficiency of an operator of the electrically powered scooter;
code, into a wireless signal, the information that is based on an operator proficiency of an operator of the electrically powered scooter;
send the wireless signal to an infrastructure article configured to receive the wireless signal from a signal emitter device configured at the electrically powered scooter.

* * * * *